United States Patent
Cincione et al.

(10) Patent No.: US 10,831,276 B2
(45) Date of Patent: Nov. 10, 2020

(54) TUNGSTEN FRAME OF A HAPTIC FEEDBACK MODULE FOR A PORTABLE ELECTRONIC DEVICE

(71) Applicant: Apple Inc., Cupertino, CA (US)

(72) Inventors: Dominic P. Cincione, San Francisco, CA (US); Matthew D. Dombach, San Francisco, CA (US); Darya Amin-Shahidi, San Jose, CA (US); Scott D. Ridel, Redwood City, CA (US); Vu A. Hong, Redwood City, CA (US); Alex J. Speltz, San Francisco, CA (US); Denis G. Chen, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/250,938

(22) Filed: Jan. 17, 2019

(65) Prior Publication Data

US 2020/0081540 A1    Mar. 12, 2020

Related U.S. Application Data

(60) Provisional application No. 62/728,484, filed on Sep. 7, 2018.

(51) Int. Cl.
| | | |
|---|---|---|
| *G06F 3/01* | (2006.01) | |
| *H04M 1/02* | (2006.01) | |
| *B06B 1/04* | (2006.01) | |

(52) U.S. Cl.
CPC .............. *G06F 3/016* (2013.01); *B06B 1/045* (2013.01); *G06F 2203/014* (2013.01); *H04M 1/02* (2013.01)

(58) Field of Classification Search
CPC ...... G06F 3/016; G06F 3/0481; G06F 3/0487; G06F 2203/014; G01H 11/06; H04M 1/02; B06B 1/04; B06B 1/045
See application file for complete search history.

(56) References Cited

U.S. PATENT DOCUMENTS

| | | |
|---|---|---|
| 9,474,683 B1 | 10/2016 | Mortimer et al. |
| 9,513,709 B2 | 12/2016 | Gregorio et al. |
| 9,552,066 B2 | 1/2017 | Taninaka et al. |
| 9,600,071 B2 | 3/2017 | Rothkopf |
| 9,742,254 B1 | 8/2017 | Choi et al. |
| 10,566,888 B2 * | 2/2020 | Degner .................. H02K 33/16 |

(Continued)

FOREIGN PATENT DOCUMENTS

WO    WO-2018117189 A1 *  6/2018  ............... H02K 7/14

*Primary Examiner* — Darlene M Ritchie
(74) *Attorney, Agent, or Firm* — Dorsey & Whitney LLP

(57) ABSTRACT

According to some embodiments, a haptic feedback module for generating a haptic feedback event is described. The haptic feedback module includes an enclosure having walls that define a cavity. The enclosure is capable of carrying operational components within the cavity that include a frame that includes tungsten, a magnetic coil element that is capable of generating a magnetic field, a magnetic element that is carried within an aperture of the frame, linear-actuation end stops that are welded to a first end of the frame and a second end of the frame that opposes the first end, and springs that couple together the walls of the enclosure to the linear-actuation end stops.

20 Claims, 12 Drawing Sheets

(56) References Cited

U.S. PATENT DOCUMENTS

| | | | |
|---|---|---|---|
| 2009/0096299 A1* | 4/2009 | Ota | B06B 1/045 |
| | | | 310/25 |
| 2011/0133577 A1* | 6/2011 | Lee | H02K 33/18 |
| | | | 310/15 |
| 2012/0049660 A1* | 3/2012 | Park | B06B 1/045 |
| | | | 310/25 |
| 2012/0169151 A1* | 7/2012 | Dong | H02K 33/16 |
| | | | 310/25 |
| 2012/0223880 A1 | 9/2012 | Birnbaum et al. | |
| 2012/0232780 A1 | 9/2012 | Delson et al. | |
| 2012/0249462 A1 | 10/2012 | Flanagan et al. | |
| 2013/0002411 A1* | 1/2013 | Henderson | H02N 2/005 |
| | | | 340/407.1 |
| 2014/0167941 A1 | 6/2014 | Rank et al. | |
| 2015/0130730 A1* | 5/2015 | Harley | G06F 3/016 |
| | | | 345/173 |
| 2015/0220148 A1 | 8/2015 | Gregorio et al. | |
| 2015/0301673 A1 | 10/2015 | Peshkin et al. | |
| 2015/0349619 A1* | 12/2015 | Degner | H02K 41/0356 |
| | | | 310/12.21 |
| 2016/0144404 A1 | 5/2016 | Houston et al. | |
| 2016/0248310 A1 | 8/2016 | Elenga et al. | |
| 2017/0070131 A1* | 3/2017 | Degner | H02K 35/00 |
| 2017/0084138 A1* | 3/2017 | Hajati | G08B 6/00 |
| 2017/0085165 A1* | 3/2017 | Hajati | H02K 33/02 |
| 2018/0021812 A1* | 1/2018 | Akanuma | H02K 33/16 |
| | | | 310/25 |

\* cited by examiner

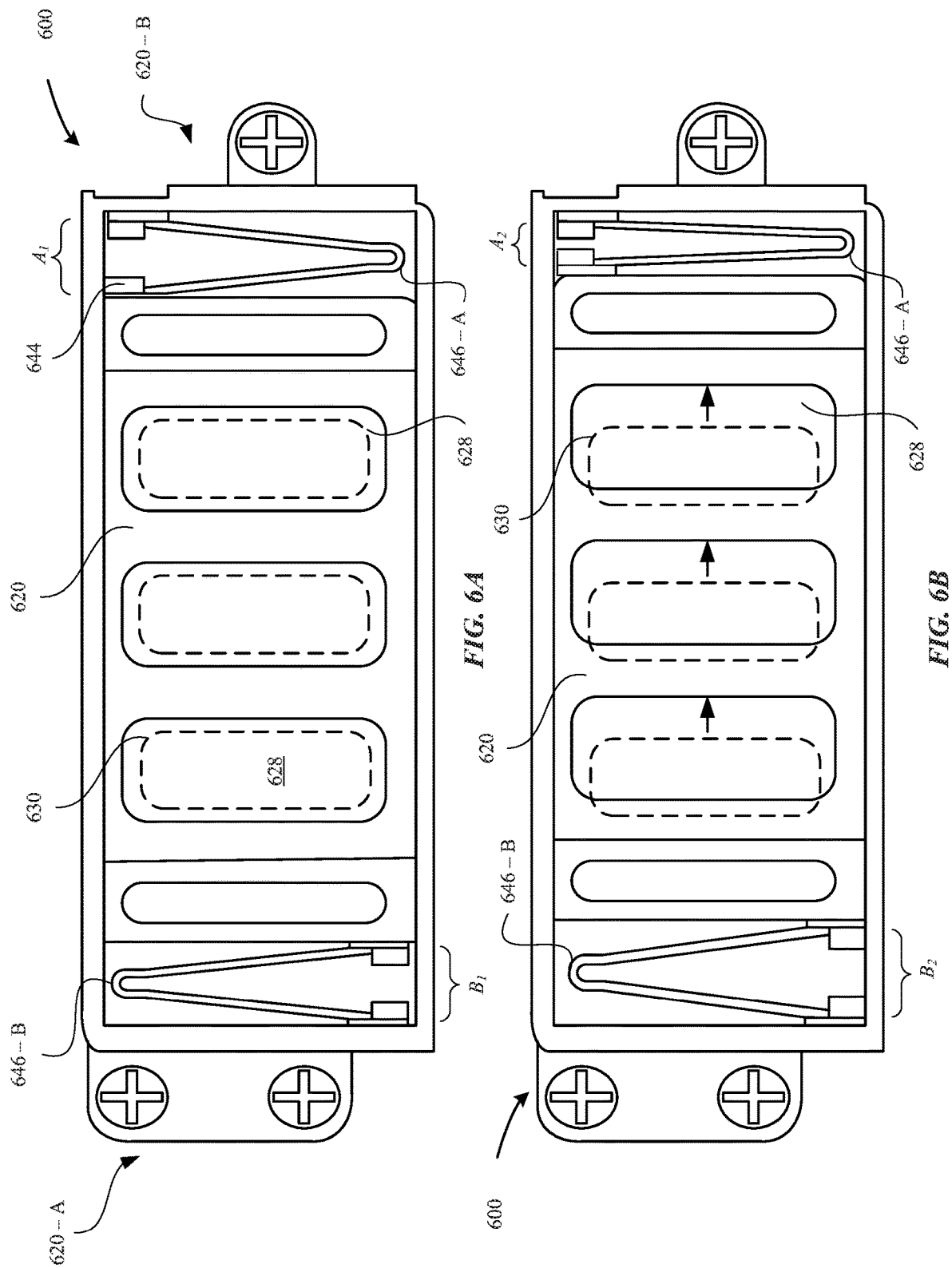

TUNGSTEN FRAME OF A HAPTIC FEEDBACK MODULE FOR A PORTABLE ELECTRONIC DEVICE

CROSS-REFERENCE TO RELATED APPLICATIONS

The present application claims the benefit of U.S. Provisional Application No. 62/728,484, entitled "TUNGSTEN FRAME OF A HAPTIC FEEDBACK MODULE FOR A PORTABLE ELECTRONIC DEVICE," filed Sep. 7, 2018, the content of which is incorporated herein by reference in its entirety for all purposes.

This patent application is related and incorporates by reference in their entirety the co-pending U.S. patent application Ser. No. 15/691,483, entitled "HAPTIC ARCHITECTURE IN A PORTABLE ELECTRONIC DEVICE," filed Aug. 30, 2017.

FIELD

The described embodiments relate generally to a feedback system for executing a haptic feedback event. More particular, the descried embodiments involve the feedback system including a frame that includes tungsten.

BACKGROUND

Conventional portable electronic devices can include feedback components for executing haptic feedback in conjunction with providing a notification to a user. However, these portable electronic device may be covered with cases, folios, or other accessory devices that reduce the impact of the haptic feedback that is generated. Accordingly, there is a need to generate haptic feedback that is more perceptible to a user without modifying the operational components of the feedback component and/or the dimensions of the feedback component.

SUMMARY

This paper describes various embodiments that relate to a feedback system for executing a haptic feedback event. More particular, the descried embodiments involve the feedback system including a frame that includes tungsten.

According to some embodiments, a haptic feedback module for generating a haptic feedback event is described. The haptic feedback module includes an enclosure having walls that define a cavity. The enclosure is capable of carrying operational components within the cavity that include a frame that includes tungsten, a magnetic element that is carried by the frame, a magnetic coil element that is capable of generating a magnetic field that interacts with the magnetic element such as to displace the frame, and linear-actuation end stops that are coupled to a first end of the frame and a second end of the frame that opposes the first end.

According to some embodiments, a portable electronic device is described. The portable electronic device includes an enclosure having walls that define a cavity, where the enclosure is capable of carrying components that include a processor capable of providing instructions and a feedback system in communication with the processor. The feedback system includes a frame comprised of tungsten, where the frame carries a magnetic element. The feedback system further includes magnetic coil elements that are in communication with the processor, where when the magnetic coil elements receive the instructions from the processor, the magnetic coil elements generate a magnetic field that interacts with the magnetic element such as to cause the frame to oscillate in a generally linear direction, and end stops that are coupled to the frame.

According to some embodiments, a portable electronic device is described. The portable electronic device includes a housing having walls that define a cavity, where the walls are capable of carrying operational components within the cavity that include a processor capable of providing instructions and a feedback module in communication with the processor and coupled to at least one of the walls. The feedback module is capable of carrying operational components within the cavity that include a frame formed from tungsten, where the frame includes a magnetic element. The feedback module further includes a variable magnetic element that is capable of generating a magnetic field in response to the feedback module receiving the instructions from the processor, where the magnetic field generated by the variable magnetic element interacts with the magnetic element such as to cause the frame to actuate in a generally linear direction.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements, and in which:

FIGS. 6A-6B illustrate top views of an exemplary sequence diagram of a haptic feedback module that is configured to implement different aspects of the various techniques described herein, in accordance with some embodiments.

Figure 1A:
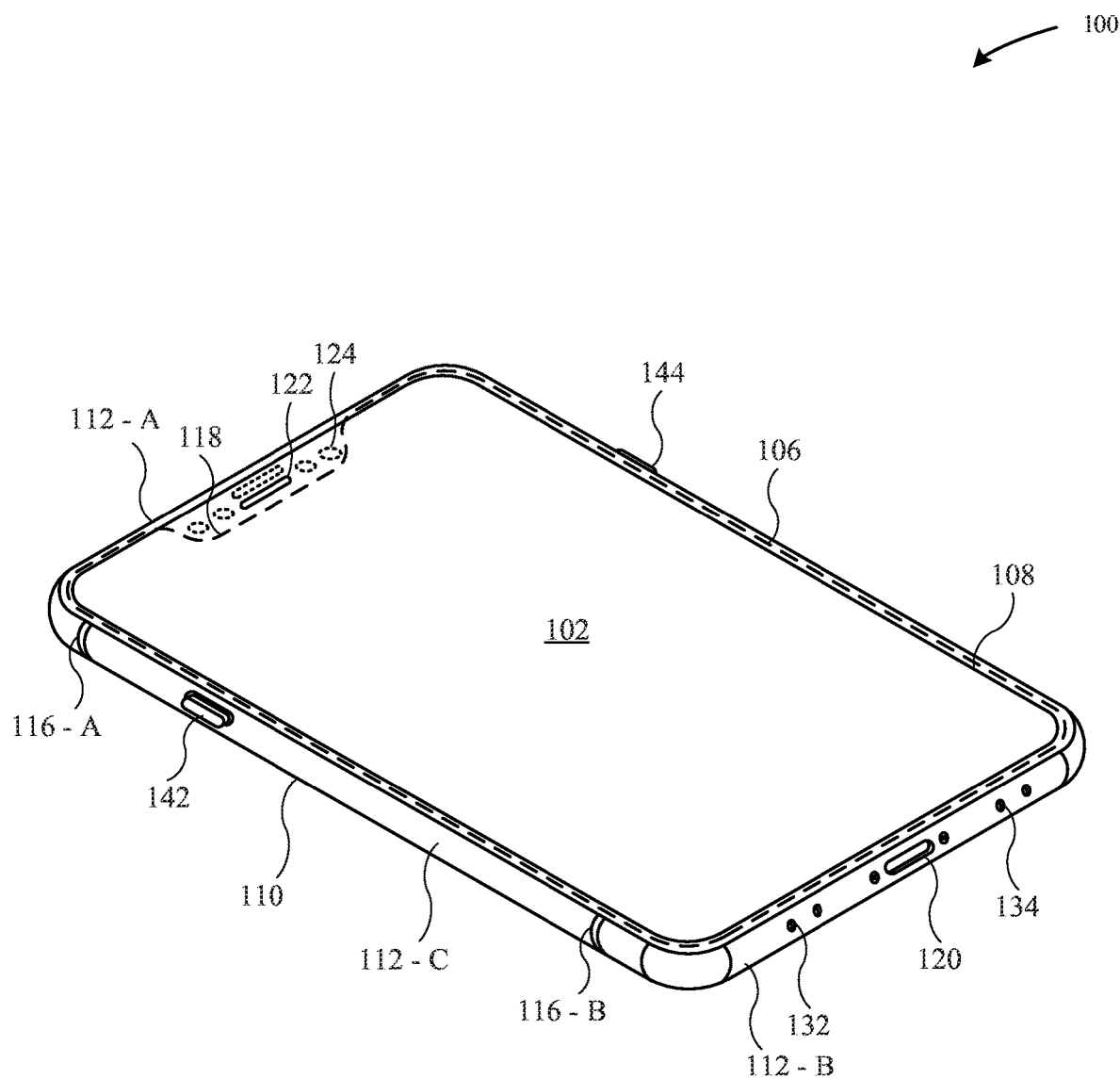
FIGS. 1A-1B illustrate perspective views of a portable electronic device that is configured to implement different aspects of the various techniques described herein, in accordance with some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments described herein relate generally to a feedback system for executing a haptic feedback event. More particular, the descried embodiments involve the feedback system including a frame that includes tungsten.

Although portable electronic devices include feedback components for executing haptic feedback in conjunction with providing a notification to a user, these portable electronic devices may be utilized in an environment and/or situation where the user does not readily perceive the haptic feedback. For example, these portable electronic devices may be covered with cases, folios, or other accessory devices that reduce the impact of the haptic feedback that is generated. Additionally, these portable electronic devices may be carried within a pocket of a user's jacket, within a user's purse, or laid on a surface of a cushion of a couch. In all of the aforementioned scenarios, the environment and/or situation may diminish the impact of the haptic feedback event. Although the feedback components may be modified to increase the amount of perceptible feedback, such as increasing the dimensions of the feedback component, great care should be taken to avoid increasing the dimensions of the feedback component. Indeed, conventional feedback components may already occupy a large amount of space within a cavity. Accordingly, increasing the dimensions of the feedback components further reduces the amount of available space.

To cure the aforementioned deficiencies, the systems and technique described herein relate to a feedback module that includes a frame formed from tungsten. In some examples, the frame is formed entirely from tungsten. Tungsten has a high density and mass per volume ratio relative to other materials. Accordingly, the feedback module that includes a tungsten frame is able to generate up to 25% greater user perception and feel without significantly modifying the structure and/or dimensions of the feedback module.

According to some embodiments, a haptic feedback module for generating a haptic feedback event is described. The haptic feedback module includes an enclosure having walls that define a cavity. The enclosure is capable of carrying operational components within the cavity that include a frame that includes tungsten, a magnetic element that is carried by the frame, a magnetic coil element that is capable of generating a magnetic field that interacts with the magnetic element such as to displace the frame, and linear-actuation end stops that are coupled to a first end of the frame and a second end of the frame that opposes the first end.

These and other embodiments are discussed below with reference to FIGS. 1-9; however, those skilled in the art will readily appreciate that the detailed description given herein with respect to these figures is for explanatory purposes only and should not be construed as limiting.

Figure 1B:
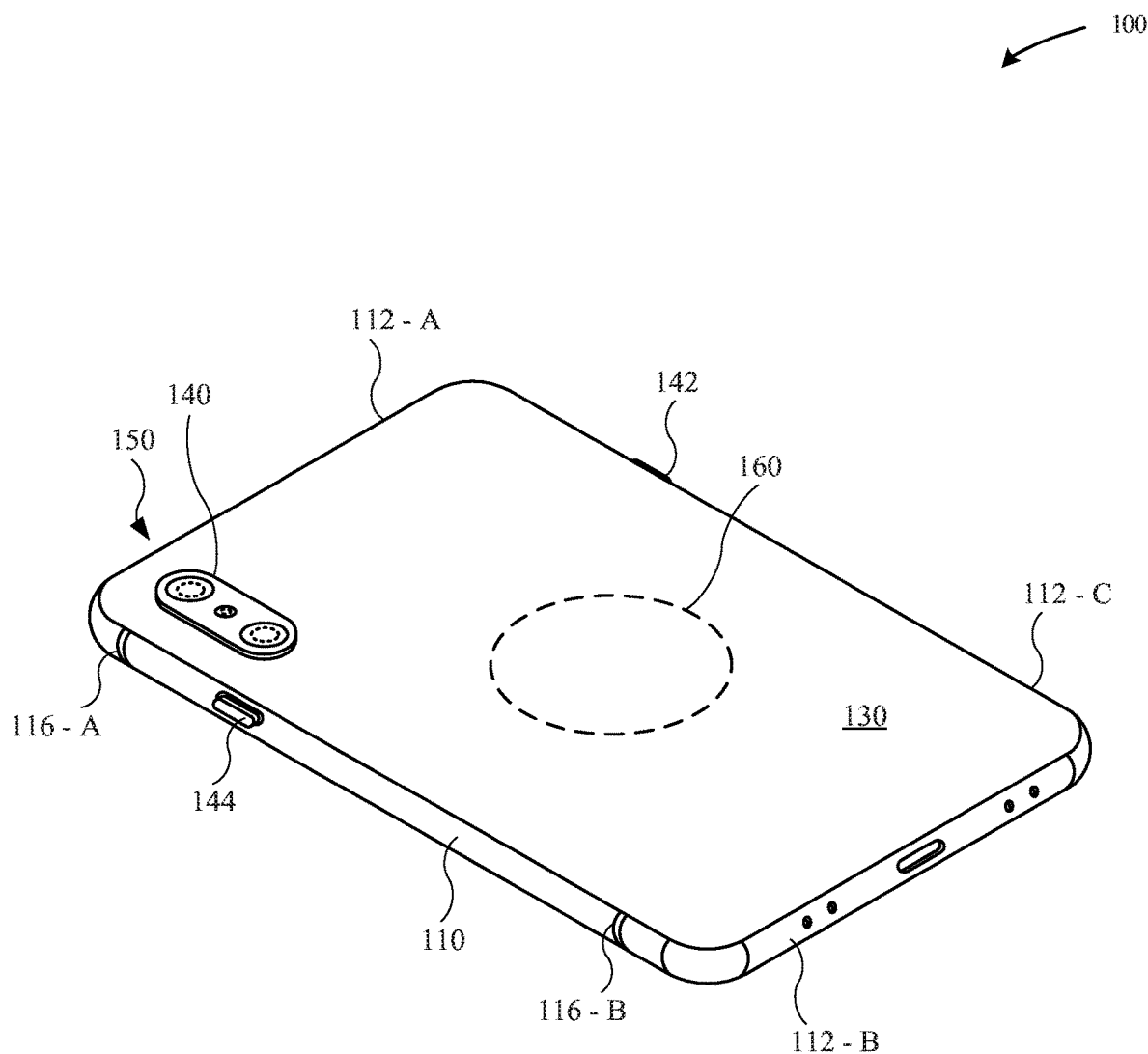

FIGS. 1A-1B illustrate a portable electronic device that includes a haptic feedback module, in accordance with some embodiments. According to some examples, the portable electronic device can include a computing device, a smartphone, a mobile phone, a wearable consumer device, and the like.

FIG. 1A illustrates a first perspective view of a portable electronic device 100, where the portable electronic device 100 includes an enclosure 110 having walls that define a cavity, where one or more operational components are carried within the cavity. The enclosure 110 includes a top wall 112-A, a bottom wall 112-B, and side walls 112-C. The enclosure 110 of the portable electronic device 100 can also be referred to as a housing.

FIG. 1A illustrates that the portable electronic device 100 includes a display assembly 102 that covers a majority of a top surface of the enclosure 110. The display assembly 102 can include a capacitive unit and/or a force detection unit that is capable of detecting an input at the display assembly 102 and presenting a corresponding graphical output at the display assembly 102. In some embodiments, the display assembly 102 is overlaid by a protective cover 108, where the protective cover 108 is secured with a trim structure 106. In particular, the trim structure 106 may be joined to the enclosure 110 with an attachment feature, such as an adhesive, a weld, and the like. The protective cover 108 may prevent surface abrasions and scratches from damaging the display assembly 102. The protective cover 108 may be formed from a transparent material, such as glass, plastic, sapphire, or the like.

In some embodiments, the top wall 112-A may be separated from the bottom wall 112-B by a dielectric material 116-A, B, and the side walls 112-C may be separated from the top wall 112-A and the bottom wall 112-B by the dielectric material 116-A, B. The dielectric material 116-A, B can include plastic, injection-molded plastic, polyethylene terephthalate ("PET"), polyether ether ketone ("PEEK"), ceramic, and the like. By incorporating the dielectric material 116-A, B, the walls 112-A, B, C are capable of being electrically isolated from each other.

According to some embodiments, the portable electronic device 100 includes buttons or switches 142, 144 that are carried along the side wall 112-C. The bottom wall 112-B includes a connector 120 that is capable of providing data and/or power to the portable electronic device 100. In some examples, the connector 120 refers to a bus and power connector. According to some embodiments, the portable electronic device 100 includes a notch 122 in proximity to the top wall 112-A. As illustrated in FIG. 1A, the notch 122 is defined by a cut-out of the protective cover 108. The notch 122 includes one or more electronic components 124 (e.g., infrared detector, front-facing camera, etc.). In some examples, the one or more electronic components 124 may be utilized for facial recognition. The bottom wall 112-B can include an opening for a speaker 134 that is capable of emitting acoustic feedback (i.e., audible sound). Additionally, the bottom wall 112-B can include an opening for a microphone 132 that is capable of detecting a sound effect. In some examples, the speaker 134 and the microphone 132 may be in electrical communication with each other such as to coordinate to dynamically adjust an output of the speaker 134, such as volume, duration, and the like based on the noise in the environment surrounding the portable electronic device 100.

According to some examples, at least one of the top wall 112-A, the bottom wall 112-B, or the side wall 112-C may be formed of material other than metal. Beneficially, the use of non-metal material can reduce the amount of electromagnetic interference associated with the enclosure 110 and a wireless transceiver that is carried within the enclosure 110. Additionally, the use of non-metal material reduces the amount of parasitic capacitance between any metal support structures that are carried within the cavity and the enclosure 110. According to some examples, the non-metal material includes glass, plastic, ceramic, and the like. Although non-metal material such as glass is beneficial in permitting electromagnetic waves to pass through the enclosure 110, the glass is also more susceptible than metal to cracking or deforming when the portable electronic device 100 experiences a drop event.

FIG. 1B illustrates a second perspective view of the portable electronic device 100, in accordance with some embodiments. As illustrated in FIG. 1B, a camera 150 is carried at least in part within a protruding trim structure 140. The protruding trim structure 140 is disposed in proximity to a corner of the enclosure 110. As illustrated in FIG. 1B, the protruding trim structure 140 is secured to and extends from a back wall 130 of the portable electronic device 100. According to some examples, the back wall 130 is formed of a material other than metal. The non-metal material enables a magnetic field to pass through the enclosure 110 in order to charge wireless charging coils 160, such as magnetic cores that include ferrites.

According to some embodiments, the portable electronic device 100 carries one or more operational components within a cavity (not illustrated) of the portable electronic device 100. These operational components may include a circuit board, an antenna, a multi-core processor, a haptic feedback module, a camera, a sensor, an IR detector, an inductive charging coil, and the like.

Figure 2:
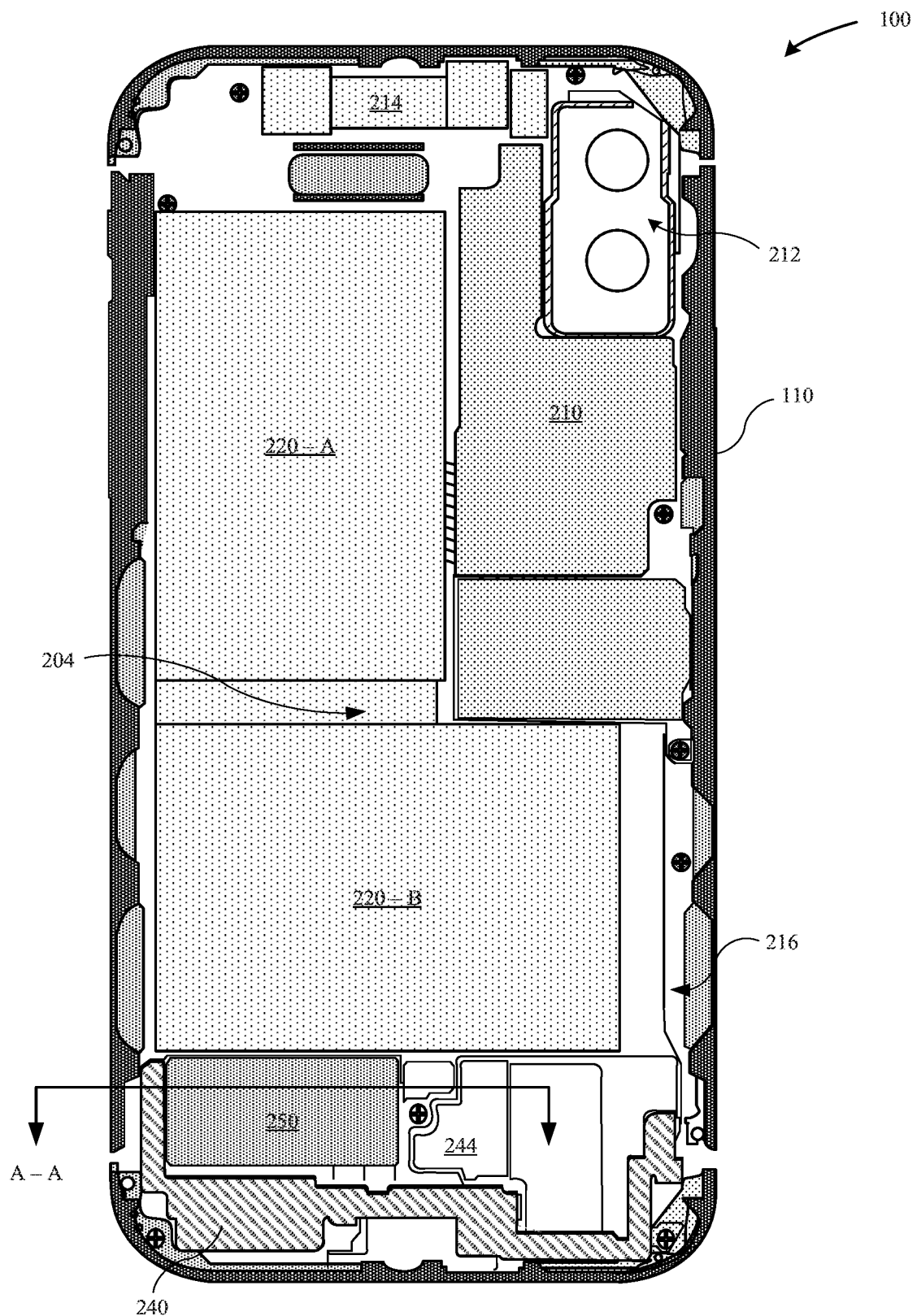
FIG. 2 illustrates a top view of a portable electronic device that is configured to implement different aspects of the various techniques described herein, in accordance with some embodiments.

FIG. 2 illustrates a top view of a portable electronic device—e.g., the portable electronic device 100—in accordance with some embodiments. In particular, FIG. 2 illustrates the top view of the portable electronic device 100 where the protective cover 108 is removed such as to reveal internal operational components carried within the cavity 216 of the portable electronic device 100. FIG. 2 illustrates the enclosure 110 carries a main logic board 210, a camera 212, electronic components 214, a power supply 220-A, B (e.g., a battery), a wireless antenna 244, a flex cable 240, and a haptic feedback module 250. The main logic board 210 can include a processor, a subscriber identity module (SIM) reader, and a memory. The flex cable 240 is capable of transmitting data signals between the wireless antenna 244, the haptic feedback module 250, and the main logic board 210.

FIG. 2 illustrates that the haptic feedback module 250 is carried in a lower portion of the cavity 216 defined by the enclosure 110. As will be described in greater detail herein, the haptic feedback module 250 is positioned away from a center of rotation 204 of the portable electronic device 100. The center of rotation 204 refers to a point in the interior cavity 216 that does not undergo planar movement. Positioning the haptic feedback module 250 further away from the center of rotation 204 can amplify the haptic feedback that is generated by the haptic feedback module 250. For example, the corners of the enclosure 110 are more likely to be held by the user's hand. As the haptic feedback module 250 is positioned close to a corner of the enclosure 110, the haptic feedback generated by the haptic feedback module 250 is more likely to be perceived by the user. In conjunction with generating the haptic feedback, the user's appendage may be in contact with the corner of the enclosure 110. Thus, there is less distance for the force generated by the haptic feedback module 250 to reach the user's appendage in contrast if the haptic feedback module 250 were positioned in proximity to the top wall 112-A of the portable electronic device 100.

The haptic feedback module 250 is configured to generate haptic feedback in conjunction with a user-initiated request or a device-initiated request. In some embodiments, the haptic feedback module 250 is configured to generate multiple haptic feedback events in conjunction with any combination of user-initiated and device-initiated requests. As described herein, the term haptic feedback (or haptic feedback event) can refer to simulating a sensation of touch by applying force, vibrations, or motions that can be perceived by a user. In some examples, the haptic feedback can stimulate nerves within the user's fingers/hands.

In some embodiments, the user-initiated request to generate haptic feedback can be initiated by a user action. In some cases, the user action can include pressing against the display 102. In some examples, the display 102 includes a capacitive touch layer that is capable of detecting a change in capacitance when a user's appendage comes into contact with the protective cover 108. In some examples, the haptic feedback module 250 is capable of generating varying haptic feedback (e.g., duration, intensity, etc.) based upon at least one of the duration, pressure, or force, and the like that is applied by the user's appendage against the protective cover 108. In some embodiments, the portable electronic device 100 includes a memory or storage device, as described in more detail with reference to FIG. 9, where the memory is configured to dynamically associate different types of contact with different types of haptic feedback to be generated. In one example, quickly touching the protective cover 108 can cause the haptic feedback module 250 to generate a short and quick burst of haptic feedback, which is associated with short frequency and high momentum. In another example, touching the protective cover 108 for a longer duration of time can cause the haptic feedback module 250 to generate a long, prolonged burst of haptic feedback, which is associated with high frequency and low momentum.

In another example, the user-initiated request can refer to the user speaking a voice command that is detected by a microphone of the portable electronic device 100 so as to cause an instruction to be executed. For example, the user may utter a voice command requesting "Play My Music", whereupon the portable electronic device 100 can provide a haptic feedback as confirmation to the user that the instruction will be executed.

In some embodiments, the haptic feedback module 250 is configured to generate haptic feedback in conjunction with a device-initiated request. In contrast to the user-initiated request, the device-initiated request can be initiated by the portable electronic device 100 without user involvement. For example, the device-initiated request can be initiated by the processor in conjunction with an occurrence of an environmental event. In some examples, the environmental event can refer to a phone call, a calendar alert, an indication of a short messaging service (SMS) message, and the like. In conjunction with the occurrence of the environmental event, the processor can be configured to receive a request to generate haptic feedback, whereupon the processor can then be configured to generate a haptic feedback parameter that is based on the type of the environmental event. In some examples, the haptic feedback module 250 is capable of communicating with any one of the operational components described herein (e.g., the electronic components 214, the main logic board 210, etc.) to execute haptic feedback.

In some embodiments, the speaker 134 is configured to supplement the haptic feedback that is generated by the haptic feedback module 250. For example, oscillation of a frame (or mass) that is internally carried within the haptic feedback module 250 can function in a manner similar to a diaphragm in that the vibration of the frame can produce ambient sound. In some embodiments, the processor can be configured to amplify the ambient sound that is output through use of the speaker 134 so that the sound can be readily perceived by the user.

Figure 3:
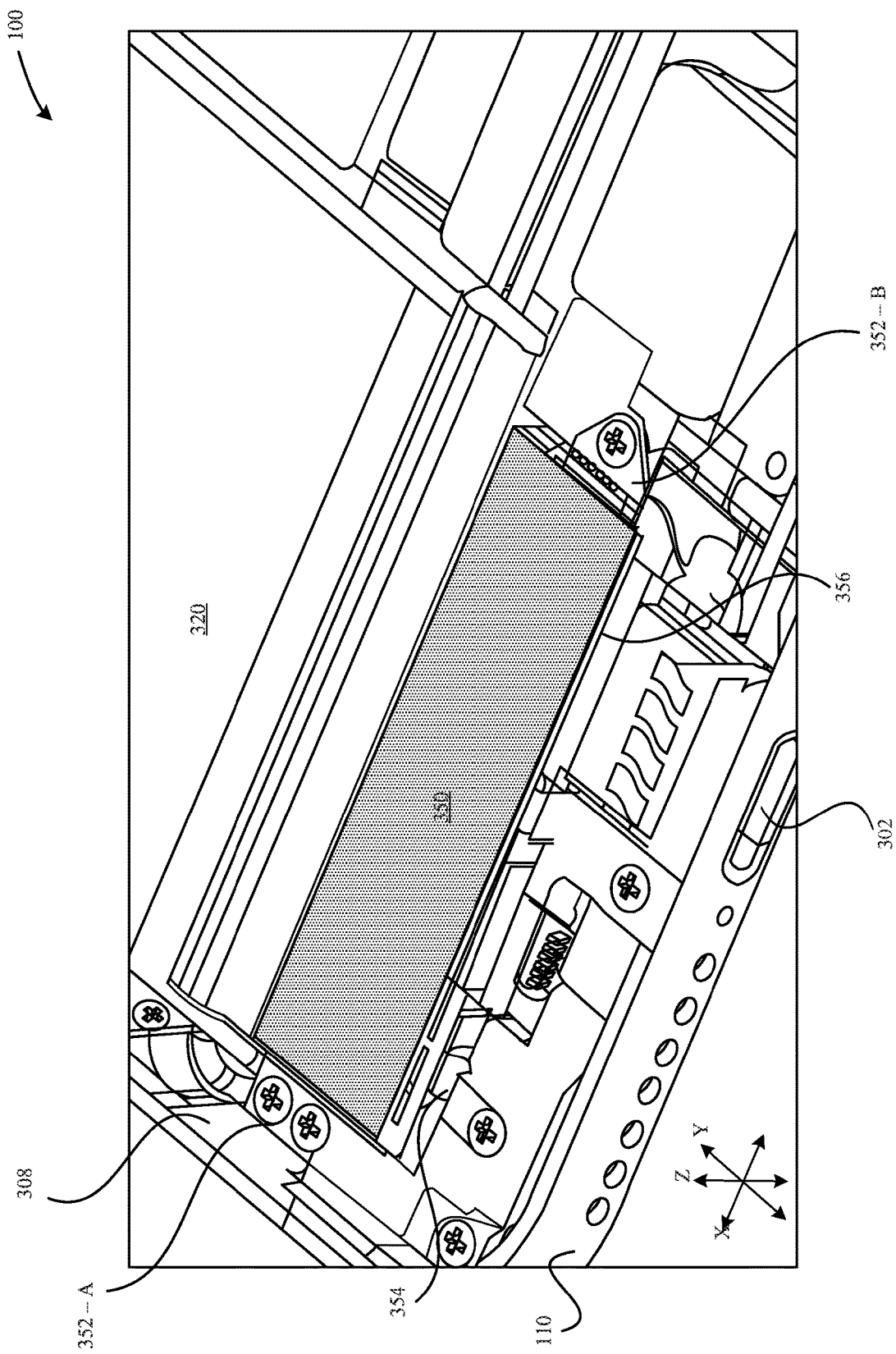
FIG. 3 illustrates a magnified perspective view of a portable electronic device that is configured to implement different aspects of the various techniques described herein, in accordance with some embodiments.

FIG. 3 illustrates a perspective view of a haptic feedback component 350 carried by an interior cavity 308 of the portable electronic device 300, in accordance with some embodiments. FIG. 3 illustrates that the haptic feedback component 350 is adjacent to a power/data connector 302. The power/data connector 302 can be configured to provide power to the portable electronic device 300 from an external power source for charging the power supply 320. In addition, the power/data connector 302 can be configured to transmit and receive data to/from at least one of the electronic components 214 or the main logic board 210. In some embodiments, the power supply 320 can be configured to provide power to the haptic feedback component 350 via a board-to-board connector 354.

FIG. 3 illustrates a perspective view of a portable electronic device—e.g., the portable electronic device 100—that includes a haptic feedback module, in accordance with some embodiments. FIG. 3 illustrates that a haptic feedback module 350 includes a retaining structure 356. The retaining structure 356 includes at least one of sides, a bottom, and a top that define a cavity that is capable of carrying a frame (or mass) that actuates in a generally linear direction parallel to the X-axis to provide haptic feedback. The retaining structure 356 includes mounting tabs 352-A, B that are included at first and second ends of the retaining structure 356. In some examples, the first and second mounting tabs 352-A, B are positioned offset from each other so that they are misaligned. In some examples, the corner of the enclosure 110 is more likely to flex than a center of the enclosure 110 (i.e., the center of rotation 204). To compensate for the additional amount of flex at the corner in conjunction with executing the haptic feedback, the retaining structure 356 can include two sets of fasteners at the first mounting tab 352-A. Furthermore, as the haptic feedback module 350 is coupled to the walls of the enclosure 110 by the first and second mounting tabs 352-A, B, any force that is generated by displacement or oscillation of a frame of the haptic feedback module 350 is translated to the wall of the enclosure 110 via the first and second mounting tabs 352-A, B.

The mounting tabs 352-A, B may be formed of a material (e.g., stainless steel, titanium, etc.) having sufficient rigidity such as to resist deformation while the haptic feedback module 350 generates haptic feedback. Additionally, the rigidity of the material also prevents the haptic feedback module 350 from becoming misaligned. In particular, the first and second mounting tabs 352-A, B couple the haptic feedback module 350 to the enclosure 110. In some embodiments, the first and second mounting tabs 352-A, B of the retaining structure 356 are each coupled to a protruding attachment feature (e.g., boss) that protrudes from a wall of the enclosure 110. In some embodiments, the retaining structure 356 of the haptic feedback module 350 is separated from a back wall 130 of the enclosure 110 by a gap in the Z-axis such as to allow the haptic feedback module 350 to displace in the Z-axis direction when the portable electronic device 100 is subject to a load event (e.g., dropped on the ground). Beneficially, the gap provides room in the Z-axis to prevent the haptic feedback module 350 from crashing against the back wall 130.

As illustrated in FIG. 3, the haptic feedback module 350 is electrically coupled to the main logic board 210 by a board-to-board connector 354. Additionally, via the board-to-board connector 354 or other cable, the haptic feedback module 350 is electrically coupled to a power supply 320 (e.g., battery) that provides an electric current to a magnetic coil element of the haptic feedback module 350. In turn, the magnetic coil element generates a magnetic field.

Figure 4:
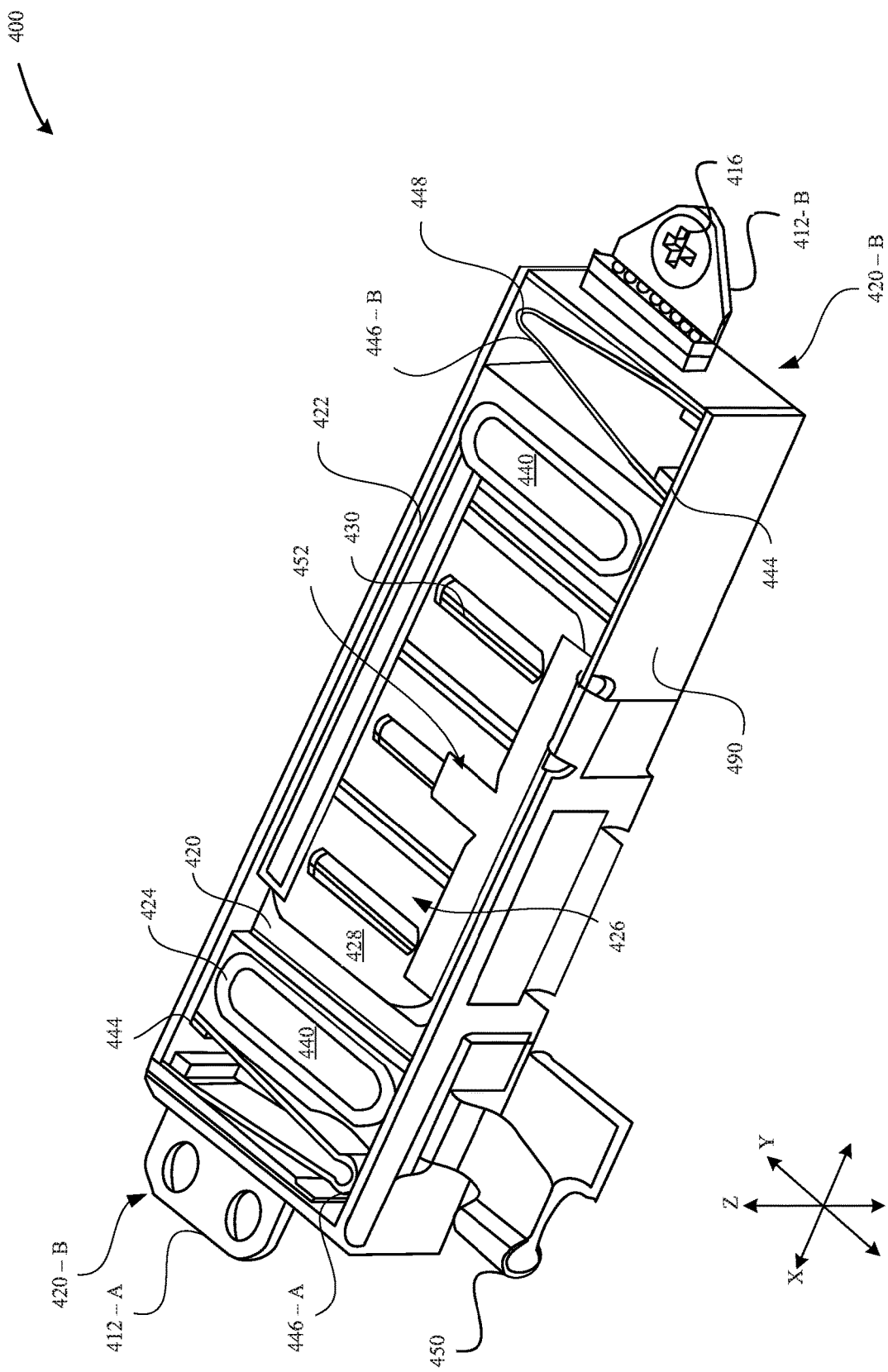
FIG. 4 illustrates a perspective view of a haptic feedback module that is configured to implement different aspects of the various techniques described herein, in accordance with some embodiments.

FIG. 4 illustrates a perspective view of a haptic feedback module 400, in accordance with some embodiments. In some examples, the haptic feedback module 400 corresponds to the haptic feedback modules 250, 350 as described herein. As illustrated in FIG. 4, the haptic feedback module 400 is characterized as having a generally elongated shape having a longitudinal axis that is generally parallel to the X-axis of the portable electronic device 100.

The haptic feedback module 400 includes a retaining structure 490 having a bottom, sides that extend from the bottom, and a top (not illustrated) that define a cavity that is capable of carrying a frame 420. In some embodiments, the frame 420 may also be referred to as a mass. The frame 420 is capable of actuating or oscillating in a linear direction that is generally parallel to the X-axis. In particular, the frame 420 is capable of oscillating between first and second ends 420-A, B of the retaining structure 490. In other words, the frame 420 has dimensions (e.g., width, length, height) that are less than the dimensions of the retaining structure 490.

In some examples, the retaining structure 490 can be fabricated from stainless steel. In particular, the retaining structure 490 can be shaped through a computerized numerical control (CNC) machining process. Beneficially, stainless steel lends itself to being easily machined via the CNC machining process according to a number of different shapes, such as rectangular, circular, polygonal, etc. FIG. 4 illustrates a first mounting tab 412-A and a second mounting tab 412-B that are included at opposing first and second ends 420-A, B of the retaining structure 490. The first and second mounting tabs 412-A, B include threaded openings for receiving fasteners 416 for coupling the retaining structure 490 to at least one of the walls of the enclosure 110.

FIG. 4 illustrates the frame 420 is overlaid by plates 422. In particular, the frame 420 includes upper and lower surfaces, and the upper and lower surfaces are both overlaid by the plates 422. In some examples, each of the plates 422 has a shape that generally matches the shape of the frame. In particular, each of the plates 422 carries at least one magnetic coil element 428. Although FIG. 4 illustrates that the plates 422 carry three magnetic coil elements 428, it should be noted that any number of magnetic coil elements 428 may be carried by the plates 422. The magnetic coil elements 428 overlay permanent magnetic elements 430, where the permanent magnetic elements 430 are carried within apertures of the frame 420.

According to some embodiments, the frame 420 is comprised of tungsten. In some examples, the frame 420 is comprised entirely from tungsten or comprised generally from tungsten. In some examples, the frame 420 is comprised of a series of individual tungsten balls. In some examples, the series of individual tungsten balls can be secured to brackets 440 via an adhesive 424.

In particular, the frame 420 includes tungsten in substitution of stainless steel. Tungsten has a greater density (19.3 g/cm$^3$) than stainless steel (7.7 g/cm$^3$). As a result, tungsten provides a greater amount of mass per volume than stainless steel. Beneficially, a frame 420 that is comprised from tungsten provides a stronger lower resonant frequency than the use of stainless steel in the frame 420. Tungsten is a denser material than stainless steel, and as a result, the tungsten may require more energy by the haptic feedback module 400 to get up to speed compared to stainless steel. However, once the frame 420 is up to speed, the tungsten may generate a greater amount of feel by the user than an equivalent frame that is comprised of stainless steel. In some examples, the use of tungsten in the frame 420 results in a 15-25% gain in user feel relative to the use of stainless steel.

According to some examples, the frame 420 is comprised of sintered tungsten. Sintering involves compacting and forming a solid mass of tungsten by applying heat or pressure without melting the tungsten. In some examples, the solid mass of tungsten is sintered to a threshold temperature that is below the melting point of tungsten such that the atoms in individual tungsten particles diffuse with atoms in other tungsten particles to form a single piece of metal. Beneficially, the use of sintered tungsten results in a frame 420 that is significantly more stiff and dense than stainless steel.

It should be noted that the haptic feedback module 400 includes (i) a travel-limited region, and (ii) an energy-limited region. Of note that the travel-limited region refers to an amount of space that accommodates for displacement of the frame 420 along the X-axis. However, the amount of displacement within the X-axis is limited due to the space limitations of the cavity 216. The energy-limited region refers to getting the frame 420 up to speed to generate the necessary amount of force that can be perceived by a user.

Returning to the magnetic coil elements 428, the magnetic coil elements 428 are carried by the plate 422 that overlays the upper surface of the frame 420. As illustrated in FIG. 4, the magnetic coil elements 428 may be positioned over permanent magnetic elements 430 that are carried within apertures of the frame 420. In some examples, the permanent magnetic elements 430 may be secured to the frame 420 with an adhesive. In this manner, when the haptic feedback module 400 generates haptic feedback, the frame 420 and the permanent magnetic elements 430 are configured to displace together in a synchronous manner. In some examples, the magnetic coil elements 428 are insulated. In some embodiments, the permanent magnetic elements 430 are formed of a metal or a metal alloy that includes at least one of nickel, aluminum, or iron, and the like.

According to some embodiments, the haptic feedback module 400 includes brackets 440 that are disposed at the first and second ends 420—A, B of the haptic feedback module 400. The brackets 440 may be welded to first and second ends of the frame 420. Additionally, the brackets 440 include c-shaped clamps or overhangs that overlay the upper and lower surfaces of the frame 420, as will be described in greater detail with reference to FIGS. 5A-5C. According to some embodiments, the brackets 440 act as end stops that prevent the frame 420 from displacing in any one of the X-axis, the Y-axis, or the Z-axis such as when the portable electronic device 100 is subject to a load event (e.g., the portable electronic device 100 is dropped on the floor). The brackets 440 prevent the frame 420 from crashing against the sides and/or bottom of the retaining structure 490.

According to some embodiments, the haptic feedback module 400 includes springs 446 A-B that are disposed at the first and second ends 420-A, B of the haptic feedback module 400. In particular, a first spring 446-A is welded and/or glued to a first end of the frame 420, and a second spring 446-B is welded to a second end of the frame 420. The springs 446-A, B are capable of amplifying the linear displacement of the frame 420 along the X-axis. Furthermore, the springs 446-A, B are welded to the sides of the retaining structure 490. It should be noted that the springs 446-A, B are not welded directly to the frame 420 because the springs 446-A, B are subject to a significant amount of fatigue when the frame 420 oscillates.

In some examples, each of the springs 446-A, B includes a coupling arm 448 that couples together distal ends of each spring 446. Each distal end of the spring 446 can include a dampener 444 that can be configured to compress against another dampener 444 of another distal end of the same spring 446 when the distal ends of the spring 446 are compressed together. Additionally, the dampener 444 may prescribe a minimum/maximum displacement range for the frame 420 in conjunction with generating the haptic feedback. In addition, the dampener 444 can be configured to reduce or prevent ambient sounds caused by the displacement of the frame 420.

Additionally, coupling the frame 420 to the springs 446 A-B may prevent undesirable rocking motion of the frame 420 along the Y-axis/Z-axis while executing the haptic feedback. Consider, for example, that while executing the haptic feedback, the frame 420 may be susceptible to swaying along the Y-axis/Z-axis. However, this swaying motion can be detrimental to the haptic feedback module in that the frame 420 may crash against the sides of the retaining structure 490.

In some embodiments, the retaining structure 490 can include a dampening element 426 that can be dispersed throughout the permanent magnetic elements 430. The dampening element 426 can be configured to minimize or stop the displacement of the permanent magnetic elements 430 in conjunction with the haptic feedback module 400 generating haptic feedback. In some examples, the dampening element 426 is a ferrofluid, which can refer to a liquid that becomes strongly magnetized in the presence of the magnetic field that is generated by the magnetic coil elements 428. The ferrofluid includes nanoscale ferromagnetic or ferromagnetic particles suspended in a carrier fluid (e.g., solvent). In some examples, the ferrofluid can be configured to dampen or minimize the ambient noise generated during oscillation of the frame 420. In some embodiments, the dampening element 426 may refer to a compressed layer damper (CLD). The CLD may include polymeric layers that are capable of dissipating energy that occurs through generating the haptic feedback. In some examples, the polymeric layers may undergo deformation of the polymeric material for dissipating energy such as to minimize and/or prevent noise and vibrations. In some examples, the CLD includes foam, where the foam may undergo compressed and uncompressed states in order to dampen vibrations. Beneficially, CLD is light-weight and can be used to increase damping.

According to some examples, the processor of the main logic board 210 may provide instructions that cause the haptic feedback module 400 to execute one or more haptic feedback events. An electrical current is provided from the power supply 320 to the magnetic coil elements 428 that cause the magnetic coil elements 428 to generate a variable magnetic field. In turn, the variable magnetic field generated by the magnetic coil elements 428 interacts with respective magnetic fields generated by the permanent magnetic elements 430, such as through establishing a magnetic circuit and/or magnetic communication between the magnetic coil elements 428 and the permanent magnetic elements 430. The permanent magnetic elements 430 may be repelled or attracted to the magnetic coil elements 428 depending on a change in a polarity of the magnetic field generated by the magnetic coil elements 428. As the permanent magnetic elements 430 are carried by the frame 420, the frame 420 is correspondingly displaced based on the permanent magnetic elements 430 being repelled or attracted to the magnetic coil elements 428. Oscillation of the frame 420 is amplified by the springs 446-A, B such that force associated with the oscillation is transferred from the springs 446-A, B to the sides of the retaining structure 490. As a result, the force may be transferred to at least one of the walls of the enclosure 110 via the mounting tabs 412-A, B. In some examples, the range of force that is generated in conjunction with generating haptic feedback is between about 0.1 N to about 3 N.

In some embodiments, the magnetic fields generated or established by the magnetic coil elements 428 are adjusted/variable according to at least one haptic feedback parameter that is generated by the processor. In some examples, the at least one haptic feedback parameter includes at least one of polarity, amplitude, frequency, or pulse of the electrical current. The electrical current can be received at the haptic feedback module 400 via a connector 450 (e.g., a flex cable, board-to-board connector, etc.). Adjusting the electrical current provided to the magnetic coil elements 428 may affect the magnetic field generated by the magnetic coil elements 428 thus affecting at least one of a position, velocity, acceleration, momentum, or frequency of the displacement of the frame 420.

According to some embodiments, the haptic feedback module 400 includes a sensor 452—e.g., a magnetic field sensor—to detect a position of the frame 420 that is being oscillated in conjunction with executing haptic feedback. In particular, the magnetic field sensor (e.g., a Hall effect sensor, a TMR sensor, etc.) is configured to generate an electrical signal (e.g., output voltage) based on the magnetic field flux density that surrounds the magnetic field sensor. When the permanent magnetic element 430 (and the frame 420) displace in proximity of the magnetic coil elements 428, the permanent magnetic element 430 can alter the magnetic field that is detected by the magnetic field sensor. For example, as the permanent magnetic element 428 displaces in closer proximity to the magnetic field sensor, the change in the magnetic field is correspondingly increased. In some cases, the magnetic field sensor provides a detection signal that indicates the change in the magnetic field, thus providing an indication of whether the permanent magnetic element 430 (and the frame 420) are in close proximity to the magnetic field sensor.

In some cases, the sensor 452 is configured to provide a digital output—either an "on state" or an "off state." When the change in the magnetic field surrounding the sensor 452 exceeds a magnetic field threshold (e.g., disrupts the surrounding magnetic field), the sensor 452 can be configured to provide a digital output that corresponds to the "on state." The digital output of the "on state" can indicate a discrete position of the permanent magnetic element 430, such as indicating when the permanent magnetic element 430 is in its closest proximity to the sensor 452. Accordingly, the sensor 452 is capable of providing the digital output when the frame 420 is in close proximity to the sensor 452. Alternatively, when the change in the magnetic field is less than the magnetic field threshold, then the sensor 452 provides a digital output that corresponds to the "off state," which indicates that the permanent magnetic element 430 is not in close proximity to the sensor 452. In some examples, the haptic feedback module 400 can include multiple sensors 452 that are positioned throughout various locations along the length (e.g., along the X-axis) of the retaining structure 490 in order to detect multiple discrete positions of the frame 420 as it is being displaced in conjunction with executing the haptic feedback.

In some examples, a maximum value of the change in the magnetic field corresponds to the current position of the frame 420 being in closest proximity to the sensor 452. In some examples, when the current position of the frame 420 is in closest proximity to the sensor 452, the maximum value of the change in the magnetic field satisfies a magnetic field threshold value.

In some cases, the sensor 452 is configured to provide an analog output that is proportional to the change in the magnetic field that surrounds the sensor 452. In particular, the sensor 452 generates the analog output in order to provide a continuous voltage output that relates to the strength/weakness of the magnetic field surrounding the sensor 452. In one example, as the change in the magnetic field increases, the output signal by the sensor 452 (utilizing an amplifier) correspondingly increases. In some cases, the change in voltage output generated by the sensor 452 may be used to detect a relative current position of the frame 420. For example, an analog-to-digital converter can utilize a lookup table to correlate the change in voltage output to an actual current position of the frame 420. In this manner, the analog output can indicate an infinite number of current positions associated with the frame 420.

Other types of sensors can be utilized to detect the position of the frame 420 while it is being displaced in conjunction with executing haptic feedback. In one example, the sensor can refer to an optical light sensor that can be configured to utilize a measured amount of light reflectivity to detect the position of the frame 420. In one example, the frame 420 can include a reflective component (e.g., reflective tape) that is affixed to the frame 420. As the frame 420 displaces in the linear direction, the optical light sensor can measure the amount of light reflected by the reflective component in order to determine a relative position of the frame 420.

According to some embodiments, the haptic feedback module 400 is a sensor-less system that can rely upon measuring a counter-electromotive force/back electromotive force (back EMF). For example, the back EMF can refer to a voltage drop caused by the magnetic field inducing an electrical current inside the magnetic coil elements 428. In particular, the magnetic field changes due to displacement of the permanent magnetic element 430. For example, the strength of the back EMF can provide an indication as to the movement of the permanent magnetic element 430 relative to the magnetic coil elements 428. Thus, when the magnetic coil element 428 is inactive (e.g., not generating a magnetic field), the permanent magnetic element 430 does not generate back EMF. Alternatively, when the permanent magnetic element 430 generates the magnetic field, the haptic feedback component 400 can monitor for the back EMF generated by the permanent magnetic element 430. In some examples, the shape of the waveform of the back EMF signal can indicate a position of the permanent magnetic element 430 relative to the magnetic coil elements 428. Thus, the haptic feedback component 400 can determine a position of the permanent magnetic element 430 based on the back EMF, and can selectively adjust an amount of a subsequent haptic feedback based on the position of the permanent magnetic element 430. Beneficially, monitoring for changes in the back EMF can contribute to establishing an accurate sensor-less closed loop feedback system for the haptic feedback component 400 that can improve system reliability and longevity while reducing costs associated with implementing sensors.

Figure 5A:
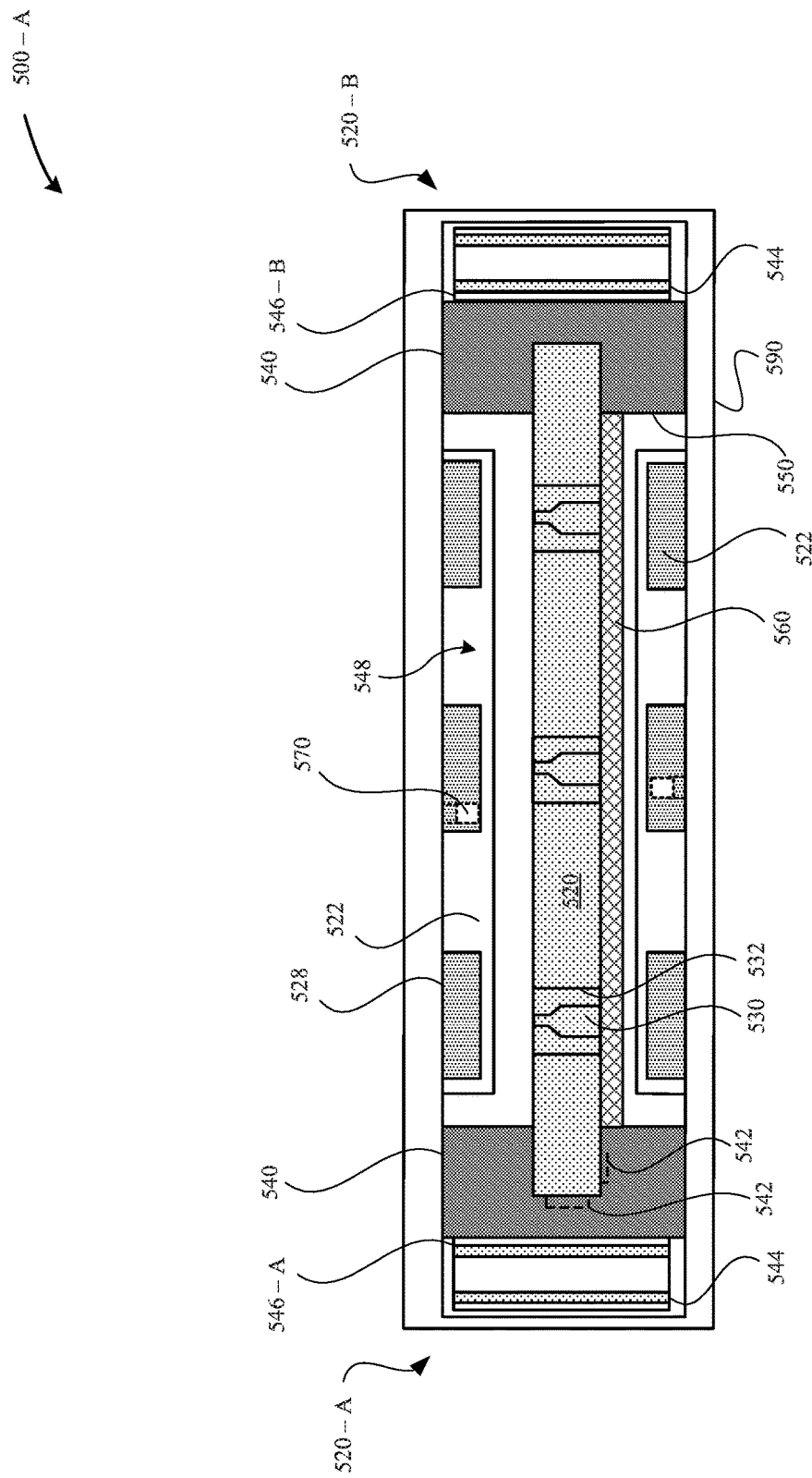
FIGS. 5A-5C illustrate side views of haptic feedback modules that are configured to implement different aspects of the various techniques described herein, in accordance with some embodiments.
Figure 5B:
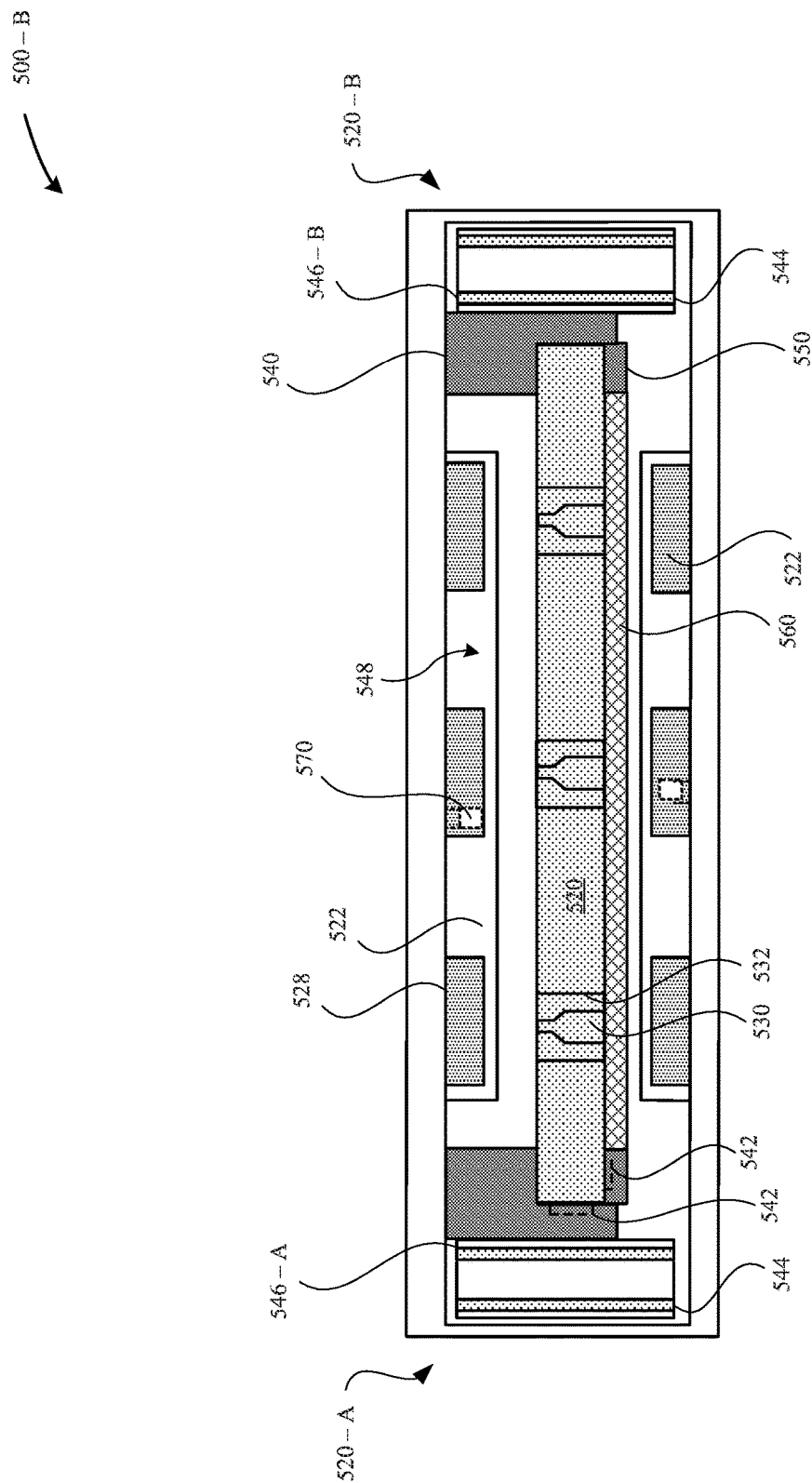
Figure 5C:
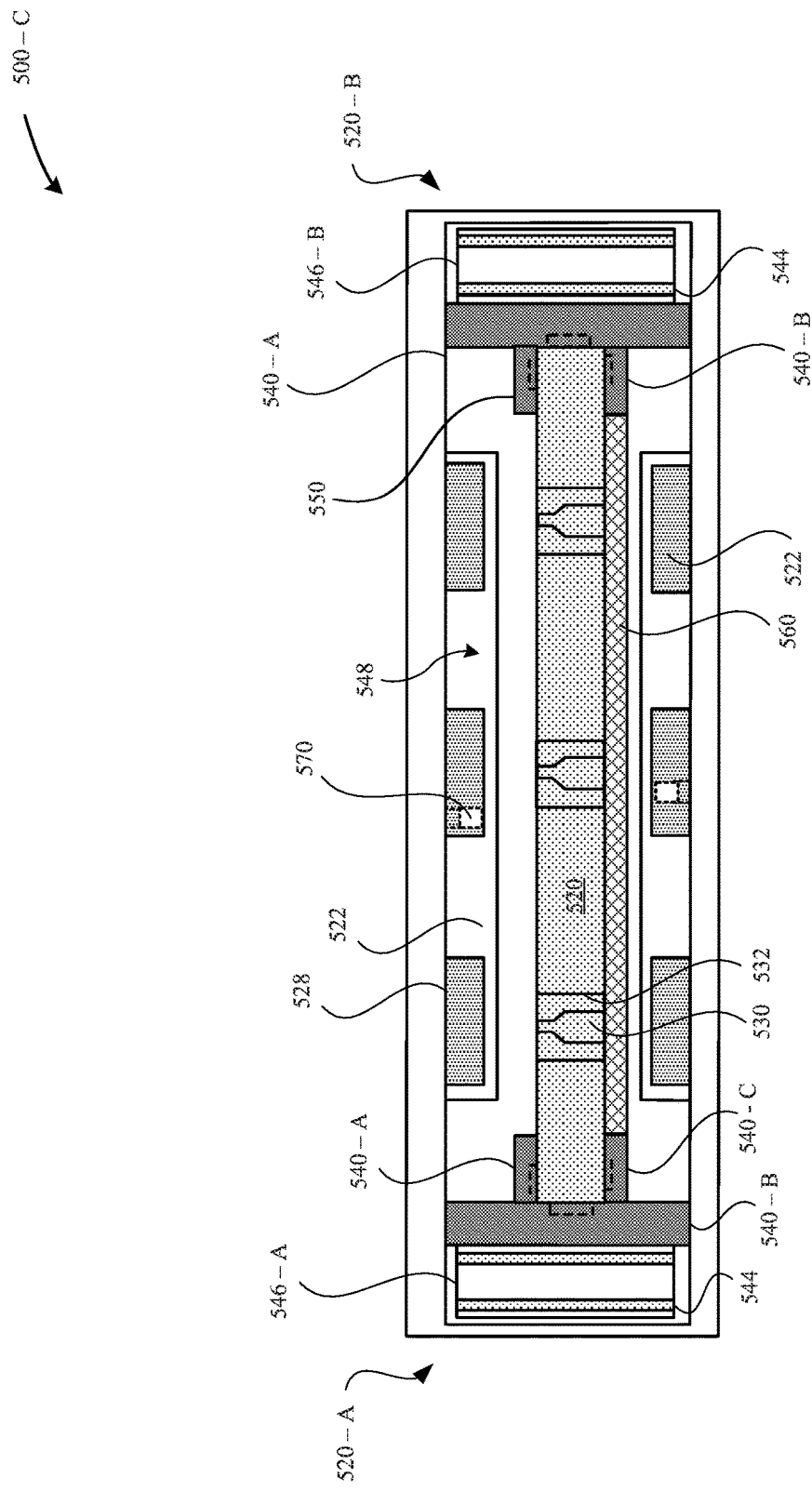

FIGS. 5A-5C illustrate side views of a haptic feedback module, in accordance with various embodiments. FIG. 5A illustrates a side view of a haptic feedback module 500-A that includes a retaining structure 590. The retaining structure 590 includes a bottom wall, side walls, and a top wall that define a cavity. The retaining structure 590 includes a frame 520 that is overlaid by plates 522. In particular, the plates 522 overlay upper and lower surfaces of the frame 520. The frame 520 includes permanent magnetic elements 530 that are carried within apertures 532 of the frame 520. In other words, the permanent magnetic elements 530 are fixedly positioned within the apertures 532 of the frame 520.

Each of the plates 522 include magnetic coil elements 528 that are capable of generating a variable magnetic field in response to receiving an electrical current from a power supply—e.g., the power supply 320. The variable magnetic field generated by the magnetic coil elements 528 is capable of interacting with a magnetic field generated by the permanent magnetic elements 530. In some examples, the magnetic field generated by the permanent magnetic elements 530 has a static intensity.

According to some embodiments, the magnetic coil elements 528 and/or the permanent magnetic elements 530 are arranged in a row. Upper and lower surfaces of each of the permanent magnetic elements 530 may be flanked by magnetic coil elements 528. Additionally, the magnetic coil elements 528 can be separated by an air gap 548.

FIG. 5A further illustrates one or more magnetic field sensors 570 that are positioned within a recess of the magnetic coil element 528. As previously described herein, the magnetic coil elements 528 are coupled to the retaining structure 590 and fixed in position. Thus, in executing the haptic feedback, the frame 520 oscillates relative to the magnetic coil elements 528 and the magnetic field sensors 570. Accordingly, and as previously described herein, the magnetic field sensors 570 are configured to determine a position of the frame 520 that is displacing in conjunction with executing haptic feedback.

The haptic feedback module 500-A includes springs 546-A, B that are disposed at the first and second ends 520-A, B of the haptic feedback module 500-A. In particular, a first spring 546-A is welded and/or glued to a first end of the frame 520, and a second spring 546-B is welded to a second end of the frame 520. The springs 546-A, B are capable of amplifying the linear displacement of the frame 520 along the X-axis. The dampener 544 is capable of compressing against another dampener 544 of the same spring 546 when the distal ends of the spring 446 are compressed together.

According to some embodiments, the haptic feedback module 500 includes brackets 540 that are disposed at the first and second ends 520—A, B of the haptic feedback module 500. The brackets 540 may be welded to first and second ends of the frame 520. Additionally, the brackets 540 include overhangs 550 that overlay the upper and lower surfaces of the frame 520. The overhangs 550 may also be welded to the upper and lower surfaces of the frame 520. In some embodiments, the brackets 540 are welded to at least one of the ends or the upper and lower surfaces of the frame 520 at heat—affected zones 542. Laser welding may be used to weld the brackets 540 to the frame 520. Additionally, the brackets 540 may also be joined to the frame 520 with an adhesive. Beneficially, the use of the adhesive reduces the amount of stress on each of the welds. Additionally, a support plate 560 may be overlaid by the frame 520, where the support plate 560 is welded to the frame 520 and one of the brackets 540.

According to some embodiments, the brackets 540 that are welded to the frame 520 apply an amount of tension against the upper and lower surfaces of the frame 520. The tension applied by the brackets 540 act as end stops that prevent the frame 520 from displacing in any one of the X-axis, the Y-axis, or the Z-axis such as when the portable electronic device 100 is subject to a load event (e.g., the portable electronic device 100 is dropped on the floor). The brackets 540 prevent the frame 520 from crashing against the sides and/or bottom of the retaining structure 590. According to some examples, the brackets 540 are comprised of stainless steel.

FIG. 5A illustrates that the brackets 540 are integrally formed with the overhangs 550 such that they are of a unibody construction. Beneficially, this increases the stiffness and rigidity of the brackets 540. As illustrated in FIG. 5A, the overhangs 550 cover the upper and lower surfaces of the frame 520.

FIG. 5B illustrates a side view of a haptic feedback module 500-B that is similar to the haptic feedback module 500-A except that the brackets 540 are not integrally formed with the overhangs 550. Instead the brackets 540 are separately formed from the overhangs 550 and subsequently each of the overhangs 550 and the brackets 540 are separately welded to the frame 520 and/or to each other. As illustrated in FIG. 5B, the overhangs 550 are welded to a lower surface of the frame 520.

FIG. 5C illustrates a side view of a haptic feedback module 500-C that is similar to the haptic feedback module 500-A except that the brackets 540 include multiple overhangs 550. As illustrated in FIG. 5C, the overhangs 550 are welded to lower and upper surfaces of the frame 520.

FIGS. 6A-6B illustrate exemplary top views of a haptic feedback module in a non-actuation mode and an actuation mode, respectively, in accordance with some embodiments.

FIG. 6A illustrates the haptic feedback module 600 in a non-actuation mode. In the non-actuation mode, the haptic feedback module 600 does not receive an electrical current and/or the amount of the electrical current received by the haptic feedback module 600 is not sufficient to cause the magnetic coil elements 628 to generate a magnetic field that causes the frame 620 to oscillate between first and second ends 620-A, B of the haptic feedback module 600.

FIG. 6A illustrates springs 646-A, B are coupled to the first and second ends of the frame 620. A distance between dampers 644 of the spring 646-A is set to a distance $A_1$ and a distance between dampers of the spring 646-B is set to a distance $B_1$.

FIG. 6B illustrates the haptic feedback module 600 in an actuation mode, in accordance with some embodiments. In the actuation mode, the haptic feedback module 600 receives an electrical current that is sufficient to cause the magnetic coil elements 628 to generate a magnetic field. The magnetic field interacts with a magnetic field generated by the permanent magnetic elements 630, thereby causing the permanent magnetic elements 630 to be repelled or attracted by the magnetic coil elements 628.

For example, as illustrated in FIG. 6B, if the permanent magnetic elements 630 and the magnetic coil elements 628 share a similar polarity, the permanent magnetic element 630 are repelled from the magnetic coil element 628. As illustrated in FIG. 6B, the permanent magnetic elements 630 may be repelled from the magnetic field generated by the magnetic coil elements 628, thereby causing the frame 620 to be directed towards the first end of the haptic feedback module 600. As illustrated in FIG. 6B, the spring 646-A is compressed such that dampers 644 come into contact with each other. The distance between the dampers is set at a distance $A_2$ where $A_2 < A_1$. Additionally, the spring 646-B is expanded such that the dampers 644 become further spread out from each other. The distance between the dampers is set at a distance $B_2$ where $B_2 > B_1$.

According to some examples, the frame 620 may oscillate back-and-forth between the first and second ends 620-A, B of the haptic feedback module 600 while executing the haptic feedback. In some examples, the frame 620 may oscillate in one or more repetitious cycles. Subsequent to executing the haptic feedback, the frame 620 may return to an initial position—i.e., the position illustrated in the non-actuation mode of FIG. 6A.

In some embodiments, the actuation mode can be characterized with a specific waveform profile. The waveform profile can provide a functional relationship between frequency (Hz) and momentum (g*mm/s). In some examples, the frequency can have a range between e.g., about 50 Hz to about 500 Hz. In some examples, the momentum can have a range between about 0 g*mm/s to about 3000 g*mm/s. In some embodiments, the haptic feedback parameter specifies an amount of power (e.g., electrical current) that is provided to the haptic feedback module 600. Subsequently, changing the power provided to the haptic feedback module 600 can cause a change in displacement of the frame 620, which can affect the waveform profile associated with the displacement of the frame 620. In some examples, a specific waveform profile can be associated with a specific type of haptic feedback to be generated.

Figure 7:
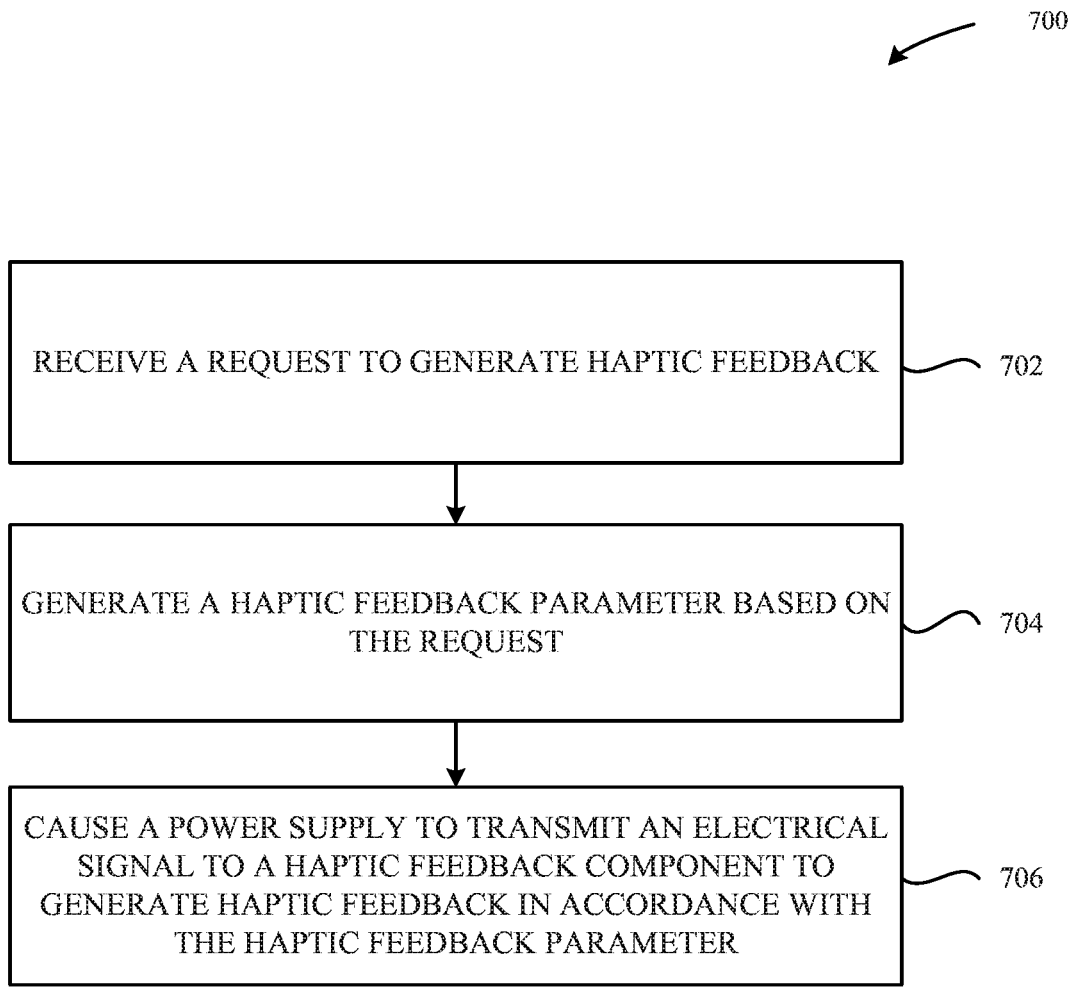
FIG. 7 illustrates a flowchart for executing haptic feedback, in accordance with some embodiments.

FIG. 7 illustrates a method 700 for executing haptic feedback at a portable electronic device, in accordance with some embodiments. As illustrated in FIG. 7, the method begins at step 702, where the portable electronic device 100 receives a request to generate haptic feedback. In some examples, the request to generate haptic feedback is made in conjunction with a user-initiated request and/or a device-initiated request.

At step 704, the portable electronic device 100 generates a haptic feedback parameter that is based on the request. In some examples, the haptic feedback parameter refers to an amplitude, frequency, pulse, or polarity of an electrical current that is to be transmitted from the power supply 320 to the haptic feedback module—e.g., the haptic feedback module 400.

At step 706, the portable electronic device 100 causes an electrical signal to be transmitted to the haptic feedback module 400 such as to generate haptic feedback that is based on the haptic feedback parameter.

Figure 8:
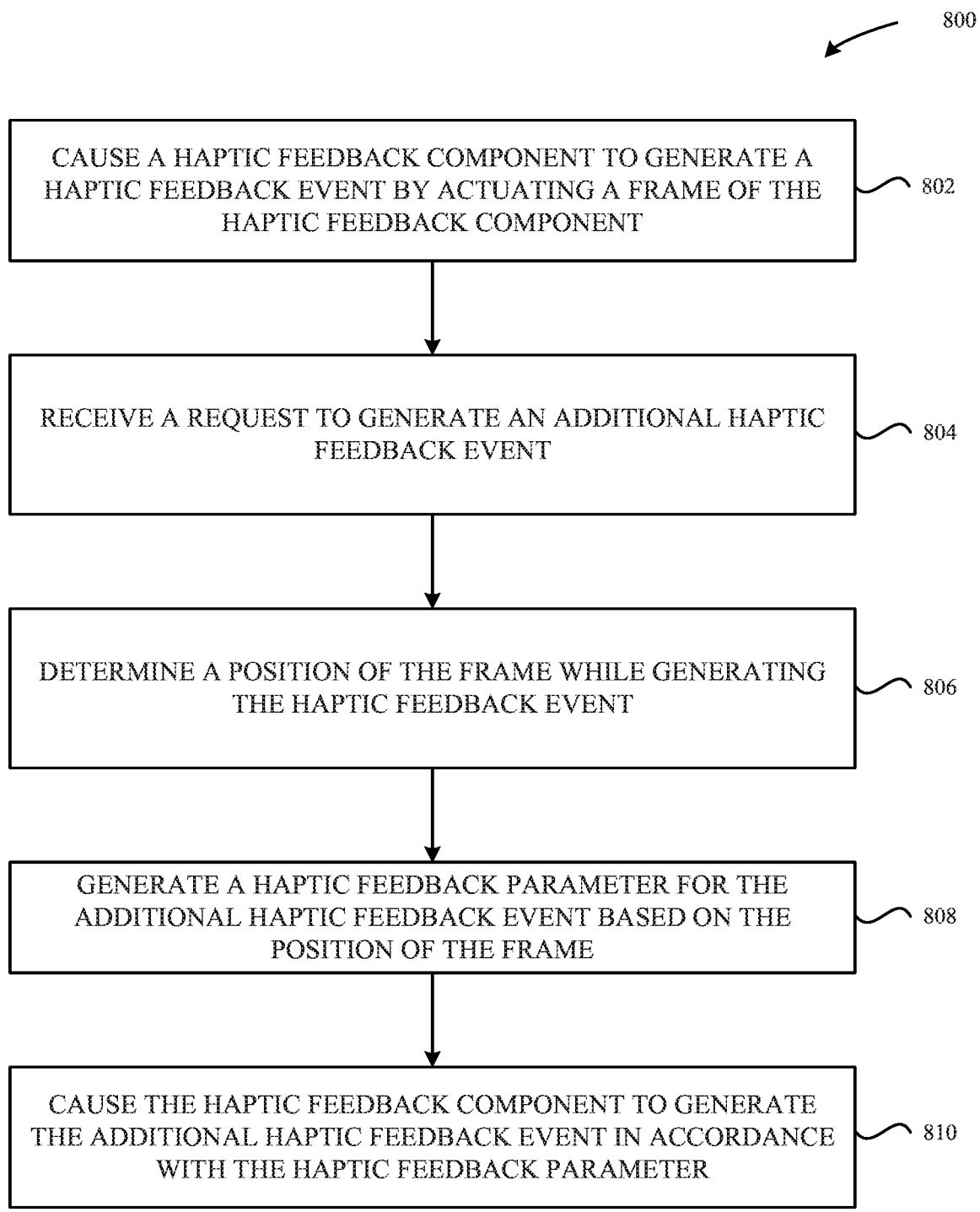
FIG. 8 illustrates a flowchart for executing haptic feedback, in accordance with some embodiments.

FIG. 8 illustrates a method 800 for executing multiple haptic feedback events, in accordance with some embodiments. In some examples, the method 800 refers to an exemplary scenario where while a haptic feedback module—e.g., the haptic feedback module 400—is generating an initial haptic feedback event, the portable electronic device 100 receives a request to generate a subsequent haptic feedback event. In another example, the portable electronic device 100 concurrently receives multiple requests to generate multiple haptic feedback events, and the portable electronic device 100 determines an order of executing these haptic feedback events based on the respective priority of each of the requests.

At step 802, the portable electronic device 100 causes the haptic feedback module 400 to generate a first haptic feedback event by actuating a frame—e.g., the frame 420—of the haptic feedback module 400.

At step 804, in conjunction with the haptic feedback module 400 generating the first haptic feedback event, the portable electronic device 100 receives a request to generate an additional haptic feedback event.

At step 806, the portable electronic device 100 determines a position of the frame 420 in conjunction with executing the first haptic feedback event. In some cases, the portable electronic device 100 determines the position of the frame 420 based on an amount of the magnetic stray flux that is associated with the one or more permanent magnetic elements 430.

At step 808, the portable electronic device 100 generates a haptic feedback parameter for the additional haptic feedback event in accordance with the position of the frame 420. In some examples, the haptic feedback parameter is characterized by at least one of e.g., amplitude, frequency, voltage, pulse, or polarity that is associated with the request. For example, a haptic feedback parameter associated with a phone call may be greater in frequency or amplitude than a haptic feedback parameter associated with a calendar alert.

At step 810, the portable electronic device 100 causes the haptic feedback module 400 to generate the additional haptic feedback event in accordance with the haptic feedback parameter. By determining the position of the frame 420, the haptic feedback module 400 is capable of readily and accurately adjusting at least one of a position, velocity, orientation, or acceleration of the frame 420 to readily accommodate for the additional haptic feedback event to be generated. In one example, the portable electronic device 100 is configured to immediately interrupt or prevent the haptic feedback module 400 from further generating the first haptic feedback event in order to accommodate the additional haptic feedback event. In another example, the portable electronic device 100 is configured to allow the first haptic feedback event to complete its execution before providing instructions to cause the additional haptic feedback event to be generated.

Figure 9:
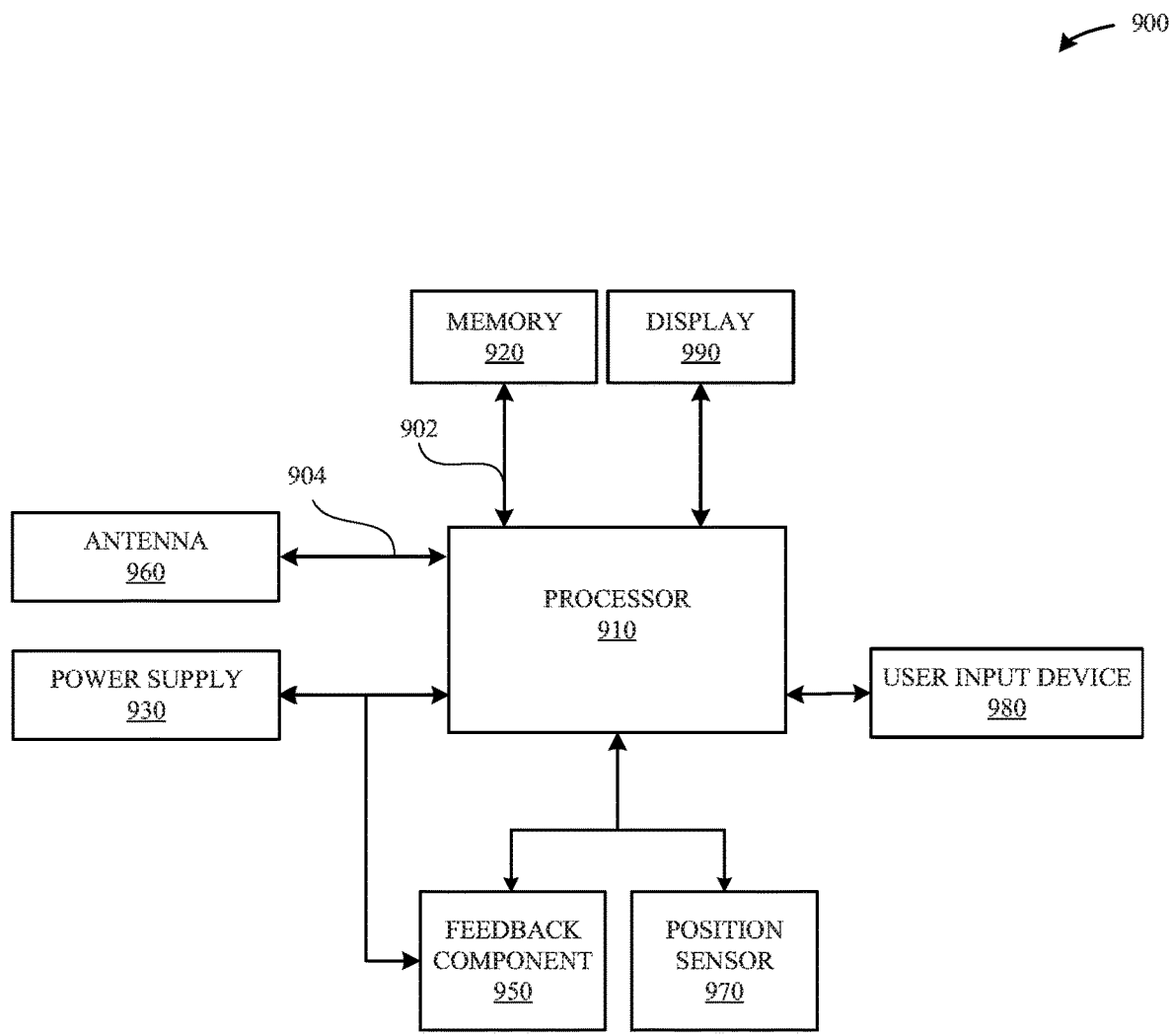
FIG. 9 illustrate a block diagram of a portable electronic device that is configured to implement different aspects of the various techniques described herein, in accordance with some embodiments.

FIG. 9 illustrates a block diagram of a portable electronic device 900 configured to implement the various techniques described herein, according to some embodiments. In particular, the detailed view illustrates various components that can be included in the portable electronic device 100 as illustrated in FIG. 1. As shown in FIG. 9, the portable electronic device 900 can include a processor 910 for controlling the overall operation of the portable electronic device 900. The portable electronic device 900 includes a display 990. The display 990 can be a touch screen panel that can include a sensor (e.g., capacitance sensor). The display 990 may be controlled by the processor 910 to display information to the user. A data bus 902 can facilitate data transfer between at least a memory 920 and the processor 910. The portable electronic device 900 can also include a network/bus interface 904 that couples a wireless antenna 960 to the processor 910.

The portable electronic device 900 includes a user input device 980, such as a switch. The user input device 980 can refer to a solid state switch relay that can be configured to detect a change in capacitance when a user's appendage makes contact with the user input device 980.

In some embodiments, the portable electronic device 900 includes a haptic feedback module 950 configured to generate haptic feedback based on a haptic feedback parameter that is generated by the processor 910. In some examples, the haptic feedback can be generated in conjunction with a user-initiated request. For example, the user-initiated request can be initiated by a user pressing down on the user input device 980. In other examples, the haptic feedback can be generated in conjunction with a device-initiated request. For example, the device-initiated request can be initiated by the portable electronic device 900 receiving a notification (e.g., phone call, text message, etc.) via the wireless antenna 960.

According to some embodiments, the portable electronic device 900 includes a position sensor 970 that can be configured to detect a position of a movable mass—e.g., the frame 420—in conjunction with the haptic feedback module 950 executing a first haptic feedback event, as previously described herein. By utilizing the position of the frame 420, the processor 910 can adjust a feedback parameter of the frame 420 (e.g., velocity, acceleration, and the like) in conjunction with executing an additional haptic feedback event. In this manner, the haptic feedback module 950 prevents any mis-fires or delays in executing the additional haptic feedback event. The processor 910, the position sensor 970, and the haptic feedback module 950 may establish a closed loop feedback system (or feedback control system).

According to some embodiments, the processor 910 can utilize the position of the frame 420 to optimize the amount that the frame 420 displaces within the haptic feedback module 950. For example, the processor 910 can detect an amount of clearance (e.g., space not occupied by the mass 820) that is present in the haptic feedback module 950. In turn, the haptic feedback module 950 can adjust the feedback parameter (e.g., velocity, acceleration, amplitude, frequency, waveform, etc.) such that the mass 820 maximizes the amount of clearance without knocking against the walls of the retaining structure 490 of the haptic feedback module 950.

According to some embodiments, the closed feedback loop system established by the haptic feedback module 950 and the position sensor 970 can be utilized to adjust a respective waveform for each haptic feedback event. In some cases, in conjunction with interrupting the first haptic feedback event, the processor 910 can establish a feedback parameter (e.g., waveform) for the additional haptic feedback event that builds from the waveform of the first haptic feedback event. In one example, although the respective waveforms associated with the first and subsequent haptic feedback events can be similar (e.g., operating at ~900 Hz), the processor 910 can modify the frequency of the subsequent haptic feedback event in order to build off the momentum generated by the waveform of the initial haptic feedback event. Beneficially, in this manner, the portable electronic device 900 can conserve some amount of power in executing the subsequent haptic feedback event. Additionally, building off the momentum generated by the waveform of the initial haptic feedback event can facilitate a smooth transition to the subsequent haptic feedback event that is perceivable by the user.

According to some embodiments, the closed feedback system established by the haptic feedback module 950 and the position sensor 970 can be configured to compensate for any deficiencies of the haptic feedback module 950 in conjunction with executing a haptic feedback event. Consider, for example, a scenario where the adhesive that couples the frame 420 to a retaining structure—e.g., the retaining structure 490—of the haptic feedback module 950 degrades over time. As a result, the degradation of the adhesive causes the frame 420 to "stick" in position (making it more difficult to displace). Thus, the haptic feedback module 950 may be required to generate more power (relative to a normal operating level) in order to displace the frame 420 from its "stuck" position. By utilizing the position sensor 970, the processor 910 can determine that the haptic feedback module 950 is not operating at its normal operating level, and, in turn, the processor 910 can compensate for these deficiencies by generating a modified amount of haptic feedback—which the user will perceive as being identical in strength to the haptic feedback generated by the haptic feedback module 950 while operating at its normal level. In this manner, the haptic feedback module 950 can be configured to maintain an optimal level of haptic feedback regardless of the wear of the hardware components. Beneficially, this prevents any need to modify the hardware components/replace hardware components.

The portable electronic device 900 also includes a memory 920, which can comprise a single disk or multiple disks (e.g., hard drives), and includes a storage management module that manages one or more partitions within the memory 920. In some embodiments, the memory 920 can include flash memory, semiconductor (solid state) memory or the like. The portable electronic device 900 can also include a Random Access Memory (RAM) and a Read-Only Memory (ROM). The ROM can store programs, utilities or processes to be executed in a non-volatile manner. The RAM can provide volatile data storage, and stores instructions related to the operation of the portable electronic device 900.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

Any ranges cited herein are inclusive. The terms "substantially", "generally," and "about" used herein are used to describe and account for small fluctuations. For example, they can refer to less than or equal to ±5%, such as less than or equal to ±2%, such as less than or equal to ±1%, such as less than or equal to ±0.5%.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

As described above, one aspect of the present technology is the gathering and use of data available from various sources to improve the delivery to users of personal content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A haptic feedback module for generating a haptic feedback event, the haptic feedback module comprising:
   an enclosure defining a cavity to house operational components;
   a frame disposed in the cavity;

a magnetic element coupled to the frame;
a magnetic coil element configured to generate a magnetic field that interacts with the magnetic element to displace the frame; and
a first end stop coupled to and overhanging a first upper surface and a first lower surface of a first end of the frame and a second end stop coupled to and overhanging a second upper surface and a second lower surface of a second end of the frame opposite the first end.

2. The haptic feedback module of claim 1, further comprising a sensor configured to determine a position of the frame.

3. The haptic feedback module of claim 1, further comprising:
a support plate that is overlaid by the frame, the support plate welded to the frame and at least one of the first end stop or the second end stop.

4. The haptic feedback module of claim 1, wherein the frame moves in a linear orientation that is generally parallel to a longitudinal axis of the enclosure.

5. The haptic feedback module of claim 4, further comprising springs that inhibit the frame from displacing in an orientation that is non-parallel with the longitudinal axis.

6. The haptic feedback module of claim 5, wherein prior to generating the haptic feedback event, the frame is in an initial position, and subsequent to generating the haptic feedback event, the springs cause the frame to return to the initial position.

7. The haptic feedback module of claim 1, further comprising a dampening element configured to minimize vibrations associated with generating the haptic feedback event.

8. The haptic feedback module of claim 7, wherein the dampening element is a compressed layer damper.

9. A portable electronic device comprising:
an enclosure having walls that define a cavity to house components;
a processor disposed in the cavity and configured to provide instructions; and
a feedback system disposed in the cavity and in communication with the processor, the feedback system configured to generate a haptic feedback event, the feedback system comprising:
a frame coupled to a magnetic element;
magnetic coil elements configured to generate a magnetic field in response to instructions from the processor, the magnetic field interacting with the magnetic element to cause the frame to oscillate in a generally linear direction; and
end stops that are coupled to opposite ends of the frame, the end stops comprising overhangs that overlay upper and lower surfaces of the frame.

10. The portable electronic device of claim 9, wherein a direction of the oscillation of the frame is defined by the end stops.

11. The portable electronic device of claim 9, wherein the end stops prevent the frame from contacting the walls of the enclosure in any of three spatial dimensions.

12. The portable electronic device of claim 9, wherein the feedback system further comprises springs that are coupled to the end stops.

13. The portable electronic device of claim 12, wherein the springs comprise a first spring and a second spring disposed adjacent to first and second ends of the frame, respectively.

14. The portable electronic device of claim 13, wherein the end stops comprise first and second brackets that are welded to the first and second ends of the frame.

15. The portable electronic device of claim 14, wherein prior to generating the haptic feedback event, the frame is in an initial position, and subsequent to generating the haptic feedback event, the springs cause the frame to return to the initial position.

16. A portable electronic device comprising:
a housing having walls that define a cavity;
a processor disposed in the cavity; and
a feedback module disposed in the cavity and in communication with the processor, the feedback module comprising:
a frame and a magnetic element;
brackets positioned at opposing ends of the frame, the brackets coupled to and overhanging upper and lower surfaces of the frame;
a variable magnetic element that generates a magnetic field in response to the feedback module receiving instructions from the processor, wherein the magnetic field generated by the variable magnetic element interacts with the magnetic element to cause the frame to actuate in a generally linear direction.

17. The portable electronic device of claim 16, wherein when the feedback module is exposed to a load event, the brackets prevent the frame from contacting sides of the feedback module.

18. The portable electronic device of claim 17, wherein the feedback module further comprises springs that are coupled to the brackets.

19. The portable electronic device of claim 17, wherein the feedback module further comprises a stainless steel support plate that is overlaid by the frame and welded to the lower surface of the frame.

20. The portable electronic device of claim 17, wherein the brackets apply tension against the upper and lower surfaces of the frame.

* * * * *